UNITED STATES PATENT OFFICE.

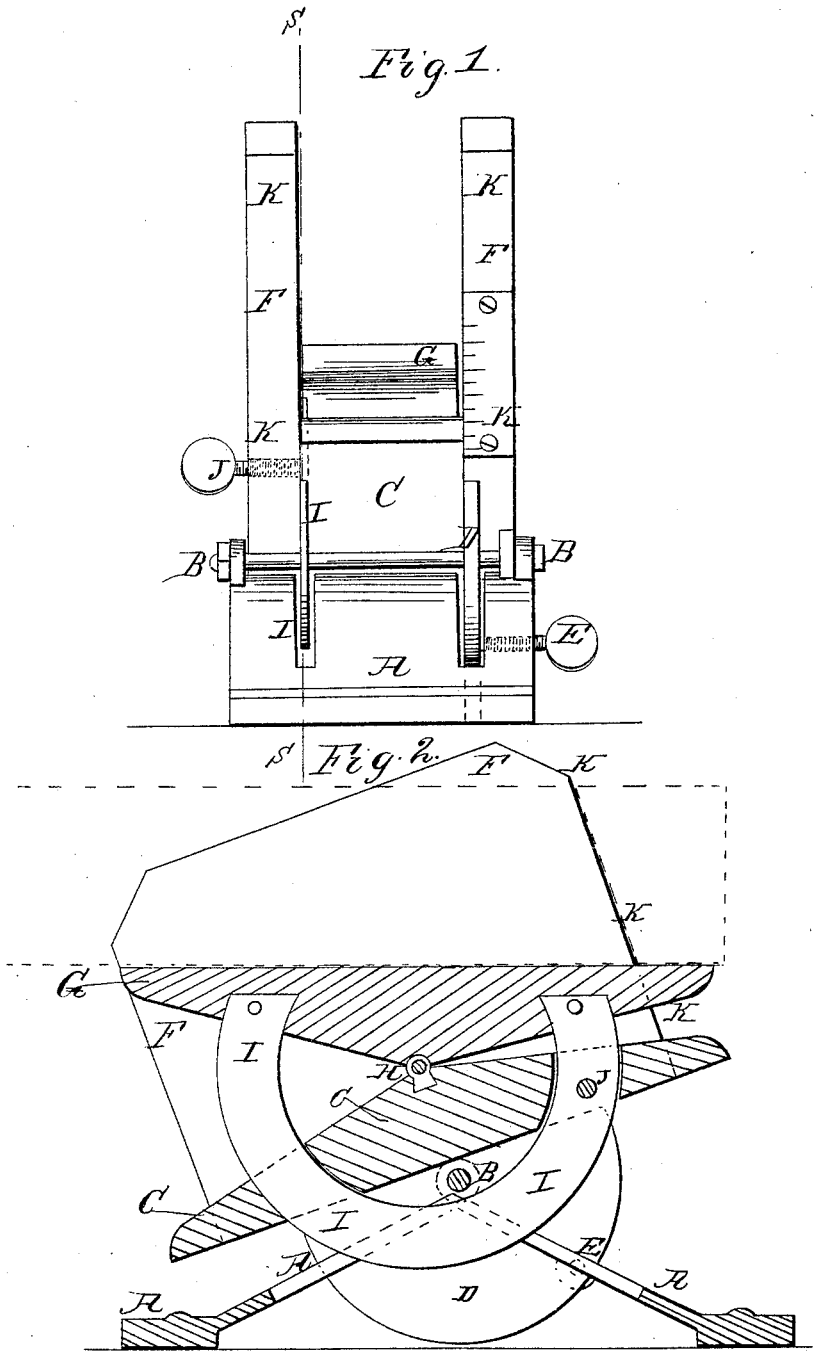

GEORGE L. CHAPIN, OF PERRYSBURG, NEW YORK.

MITER-BOX.

Specification of Letters Patent No. 17,494, dated June 9, 1857.

*To all whom it may concern:*

Be it known that I, GEORGE L. CHAPIN, of Perrysburg, in the county of Cattaraugus and State of New York, have invented a new and Improved Miter-Box; and I do hereby declare that the following is a full, clear, and exact description of the same, reference being had to the accompanying drawings, making a part of this specification, in which—

Figure 1 is an end elevation of my improved miter box. Fig. 2 is a longitudinal section of the same, the plane of section being indicated by the line S, S, in Fig. 1.

The object of my invention is to provide convenient means by which a molding or other piece of lumber or small scantling, but of any required length, may be sawed off with accuracy in a plane making a desired angle with one of its edges, without inclining the said lumber. As represented, the device is capable of guiding the saw in planes suitable for cutting at any angle, from a right angle down to about fifty-five degrees; but by changing the proportions, my invention is capable of being used to guide in cutting other angles as desired.

My invention consists substantially of a stout supporting frame A, carrying a hinge or center B, on which is supported an obtuse-angled block C, so that the latter is susceptible of rocking or tilting into variously inclined positions. A semi-circular plate D is affixed to the lower side of C, and necessarily rocks with it. By means of a set screw E, tapped in the frame A, the semicircular plate D may be firmly confined.

The part C has two boards F secured on its opposite sides, as represented, parallel each to the other; and between these boards the obtuse-angled block G is fitted, free to rock on the axis H, which latter is carried on C, as represented. The obtuse angle of this block G is presented downward, while the corresponding obtuse angle of the block C is presented upward, so that both are located in the point H.

To the under side of G is firmly attached a portion of an annular plate I, which passes loosely through a corresponding opening in the block C, but by means of a pinching screw J, tapped through F, and capable of exerting a pressure upon the annular plate I, and consequently the block G may be firmly confined in any position in which it may be placed relatively to C, and F. The edges K (Fig. 2) of the side pieces F are perfectly straight, and adapted to serve as guides, against which the saw may run while acting upon the lumber; so that, by gently pressing the side of the saw against K as it is reciprocated, the lumber will always necessarily be cut in a plane joining the two edges K, K, of the two boards F, F. On one of the edges K are graduations indicating the varying angles made by the upper surface of G with the edges K, K, which graduations may be engraved with the angle in degrees or with any technical names best known in the kind of business to which the machine is applied; the intent being that the words or figures engraved shall correctly and clearly indicate to the workman the precise angle which the plane K, K, (or, in other words, the plane in which the saw cuts,) makes with the upper surface of G.

Operation: To use my invention, it is necessary, first, to attend to the angle made by the plane K, K, and the upper surface of G, G, so that the surface remaining after the cut shall have the bevel desired; and secondly, to so incline the part C, that the upper surface of G will be horizontal, or lie in such other position as may be most convenient for the workman. Thus, suppose the angle to be that which is suitable for making a regular octagonal box or frame equal to $22\frac{1}{2}°$, the pinching screw I must first be loosened, so as to release its hold on J. Next, the obtuse-angled part G, must be inclined until the upper surface crosses K at the proper bevel, as indicated on the graduated face. Next, the screw I must be tightened to hold G, in that position. Next, the pinching screw E must be slacked, and the part C, with its sides F, which together I term the tilting box, must be inclined, necessarily carrying with it the part G, until the upper surface of G, is horizontal, or in such other position as is most convenient. Next, E must be tightened to hold the tilting box in place. The box is now ready for use; and on laying the molding, or other piece to be sawed, between the sides F, with its straight edge resting upon the upper surface of G, the saw must be pressed gently against the edges F, and the cut made by, moving the saw backward and forward in the usual manner. The effect is to cut the stuff at precisely the angle desired, while the lumber is held and manipulated in the most convenient position, instead of being held in various inclined positions, as would be necessary were the parts C, F, not susceptible of a partial revolution on the center B. In sawing very long pieces, it would be almost impossible to use the box, if it consisted of the parts G, C, F, I and J alone, without the possibility of inclining the whole, and securing it in the manner described.

Having now fully described my device, what I claim as my invention, and desire to secure by Letters-Patent, is:

The arrangement and combination of the obtuse-angled part G, with the tilting box C, F, both parts being adjustable relatively to each other and to the fixed supporting frame A, all substantially as described, and for the purposes set forth.

GEO. L. CHAPIN.

Witnesses:
   DAVID SANDERS,
   EZRA COOPER.